United States Patent [19]
Sumiyoshi

[11] Patent Number: 5,760,839
[45] Date of Patent: Jun. 2, 1998

[54] HORIZONTAL SYNCHRONIZING APPARATUS

[75] Inventor: Hajime Sumiyoshi, Saitama-ken, Japan

[73] Assignee: Kabushiki Kaisha Toshiba, Kawasaki, Japan

[21] Appl. No.: 611,402

[22] Filed: Mar. 6, 1996

Related U.S. Application Data

[63] Continuation of Ser. No. 246,248, May 19, 1994, abandoned.

[30] Foreign Application Priority Data

May 19, 1993 [JP] Japan ................................. 5-116776

[51] Int. Cl.$^6$ ................................................ H04N 5/12
[52] U.S. Cl. .................................... 348/541; 348/540
[58] Field of Search ................................ 348/541, 500, 348/530, 540; 358/150, 159, 158; 331/20; H04N 5/12

[56] References Cited

U.S. PATENT DOCUMENTS

| | | |
|---|---|---|
| 3,891,800 | 6/1975 | Janssen et al. . |
| 4,063,133 | 12/1977 | Nero et al. . |
| 4,327,376 | 4/1982 | Balaban et al. ................ 348/541 |
| 4,351,001 | 9/1982 | McGinn et al. ................ 348/541 |
| 4,467,359 | 8/1984 | Hosoya ......................... 348/541 |
| 4,769,705 | 9/1988 | Lendaro ........................ 348/541 |
| 4,803,407 | 2/1989 | Mehrgardt . |
| 5,619,276 | 4/1997 | Christopher et al. ......... 348/541 |

FOREIGN PATENT DOCUMENTS

| | | | |
|---|---|---|---|
| 0065392 | 6/1976 | Australia . | |
| 0254763 | 7/1986 | European Pat. Off. . | |
| 2307203 | 8/1974 | Germany . | |
| 47702 | 2/1977 | Japan ................ | H04N 5/12 |
| 77374 | 5/1983 | Japan ................ | H04N 5/12 |
| 58-54545 | 12/1983 | Japan ................ | H04N 5/12 |
| 216588 | 9/1987 | Japan ................ | 358/158 |

OTHER PUBLICATIONS

S. Coccetti et al., "A New Custom–Made I.C. for Monitors," IEEE International Conference on Consumer Electronics, Jun. 10, 1988, pp. 78–79.

Patent Abstracts of Japan, vol. 6, No. 123, Jul. 8, 1982, p. 1, JP–A–57 052 271.

*Primary Examiner*—Christopher C. Grant
*Attorney, Agent, or Firm*—Cushman Darby & Cushman Intellectual Property Group of Pillsbury Madison & Sutro, LLP

[57] ABSTRACT

A horizontal synchronizing apparatus includes a source for providing a horizontal synch. signal, a horizontal deflection circuit for generating a deflection current having scanning intervals and blanking intervals repetitively successing in response to driving pulses and having retrace pulses which delay from the driving pulses as a function of a load on the horizontal deflection circuit, a phase locked loop having an input, an output and a first feedback path, for producing from the output a substantial bi-level signal synchronized to the horizontal synch. signal applied to the input, and a phase controlled loop having an input, an output and a second feedback path, for maintaining the retrace pulses synchronous with the bi-level signals. The phase controlled loop has a phase detection circuit having a first input connected to the output of the phase locked loop and a second input connected to the deflection circuit, for producing a first polarity current in response to the bi-level signal when the retrace pulses are in a first state or a second polarity current in response to the bi-level signal when the retrace pulses are in a second state, a filter connected to the phase detection circuit for producing a control signal by filtering out undesired components of the first and second polarity signals, and a phase controllable device having a control input coupled to the output of the filter for producing the driving pulse which maintains the retrace pulses synchronous with the bi-level signals.

13 Claims, 7 Drawing Sheets

FIG. 2(a) HORIZONTAL SYNC. SIGNAL a1

FIG. 2(b) REFERENCE HORIZONTAL PULSE SIGNAL d1

FIG. 2(c) BI-LEVEL SIGNAL e1

FIG. 2(d) RETRACE PULSE SIGNAL j1

FIG. 2(e) DETECTED OUTPUT CURRENT f1

FIG. 2(f) CONTROL SIGNAL g1

FIG.3(a) BI-LEVEL SIGNAL e1

FIG.3(b) RETRACE PULSE SIGNAL j1

FIG.3(c) DETECTED OUTPUT CURRENT f1

FIG.3(d) CONTROL SIGNAL g1

HORIZONTAL SYNCHRONIZING APPARATUS

This is a continuation of application Ser. No. 08/246,248, filed on May 19, 1994, which was abandoned.

FIELD OF THE INVENTION

The present invention generally relates to a horizontal synchronizing apparatus for use in a television receiver or a monitoring display, and more particularly, to a horizontal synchronizing apparatus capable of preventing distortions of picture images.

BACKGROUND OF THE INVENTION

Generally when a television receiver displays images processed from a television broadcasting signal on a screen, a video signal representing as image to be displayed is formed by repetitively scanning the display screen of a picture tube by an electron beam, and at the same time by modulating the intensity of the electron beam with a video signal component of a composite video signal generated from the television broadcasting signal. The television receiver controls a deflection circuit of the horizontal synchronizing apparatus to synchronize with a sync. signal of the composite video signal, so as to make the trace of the electron beam synchronize with the video signal component.

Here, the composite video signal tends to include distortions due to noise or thermal noise, when the television broadcasting signal is received by the television receiver.

Accordingly, although horizontal sync. pulses of the horizontal sync. signal are carefully controlled to repeat at a highly stable period at a broadcasting station, the horizontal sync. pulses become irregular and indistinct by the noise when received by the television receiver. Therefore it is conventionally performed to synchronize a horizontal synchronizing apparatus which uses an oscillator for generating the horizontal sync. signal under the control of synchronization by a phase locked loop. So, even if the horizontal sync. pulses becomes indistinct due to the noise, the oscillating frequency generated from the oscillator remains constant by using the horizontal synchronizing apparatus. Thus it becomes possible to continuously produce retrace pulses for regularly controlling deflections.

Here, a horizontal synchronizing apparatus generates high voltage pulses to perform a relatively quick repetitive scanning when the television receiver operates normally. It is common that an anode high voltage for activating a television picture tube is produced by rectifying and smoothing the high voltage pulses. The horizontal synchronizing apparatus often drives a low voltage power supply source for use in circuits other than the television receiver, but it happens that timings of the retrace pulses generated by the horizontal synchronizing apparatus change in accordance with a load change of the horizontal synchronizing apparatus (e.g., a brightness change of a picture image displayed on the picture tube), so that the picture image thus displayed is distorted by the timing change of the retrace pulses.

In order to overcome the above problems, Japanese Patent Tokko-Sho 58-54545, which corresponds to the U.S. Pat. No. 4,327,376 discloses a horizontal synchronizing apparatus wherein a phase controlled loop is coupled to an output of a phase locked loop. The phase controlled loop has a phase detector which has a first input connected to an output of the phase locked loop and a second input connected to a deflection circuit for receiving a retrace pulse. The phase controlled loop makes the phase detector operate according to the retrace generated by the deflection circuit. The phase controlled loop generates a first polarity current when a bi-level signal output from the phase locked loop is in a first condition, and also generates a second polarity current when the bi-level signal is in a second condition. The phase controlled loop further includes a filter for removing an undesired component of the first and second polarity current connected to the phase detector. The phase controlled loop further includes a phase controllable means which has a control input coupled to the filter for keeping the retrace pulse synchronous with the bi-level signal by generating a driving pulse.

However, the conventional horizontal synchronizing apparatus have defects as described hereinafter.

The waveform of the retrace pulse (using a flyback pulse obtained from a flyback transformer on the common television receiver) bends by the brightness change of the picture image. Because the phase detector of the phase controlled loop operates in accordance with the retrace pulse, the first and second polarity currents output to the deflection circuit are distorted by the band. That is, the phase controlled loop operates according to the central phase of the changed retrace pulse and the bi-level signal output form the phase locked loop when a pulse width of the retrace pulse changes. Accordingly, a phase error occurs between actual retrace pulse and the bi-level signal, so that the picture image displayed on image of picture tube distorts.

In the conventional horizontal synchronizing apparatus as described above, the phase error occurs between the retrace pulse and bi-level from the phase locked loop and the picture image displayed on image of picture tube bends in the case the pulse width of retrace pulse change.

SUMMARY OF THE INVENTION

It is, therefore, an object of the present invention to provide a horizontal synchronizing apparatus which is able to remove the above mentioned problems of the prior arts.

Another object of the present invention is to provide an apparatus which is able to prevent a phase error between a retrace pulse and a bi-level signal from a phase locked loop when a pulse width of the retrace pulse varies.

In order to achieve the above object, a horizontal synchronizing apparatus according to one aspect of the present invention includes a horizontal synch. signal source for providing a horizontal synch. signal, a horizontal deflection circuit for generating a deflection current which has scanning intervals and blanking intervals repetitively successing in response to driving pulses and also retrace pulses which delay from the driving pulses as a function of a load on the horizontal deflection circuit, a phase locked loop having an input, an output and a first feedback path, for producing from the output a substantial bi-level signal synchronized to the horizontal synch. signal applied to the input, and a phase controlled loop having an input, an output and a second feedback path, for maintaining the retrace pulses in synchronous with the bi-level signals. In the horizontal synchronizing apparatus as constructed as above, the phase controlled loop is provided with a phase detection circuit having a first input connected to the output of the phase locked loop and a second input connected to the deflection circuit, for producing a first polarity current in response to the bi-level signal when the retrace pulses being a first state or a second polarity current in response to the bi-level signal when the retrace pulses being a second state, a filter connected to the phase detection circuit for producing a control signal by filtering out undesired components of the first and second polarity signals, and a phase controllable device having a control input coupled to the output of the filter for producing the driving pulse which maintains the retrace pulses in synchronous with the bi-level signals.

According to the horizontal synchronizing apparatus as constructed above, the phase detection circuit operates in response to the bi-level signal from the phase locked loop to output the first polarity detection signal when the retrace pulse from the horizontal output circuit is in the first state or to output the second polarity detection signal when the retrace pulse from the horizontal output circuit is in the second state, so that phase errors occurring between the retrace pulse and the bi-level signal from the phase locked loop when the pulse width of the retrace pulse varies are prevented.

Additional objects and advantages of the present invention will be apparent to persons skilled in the art from a study of the following description of the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
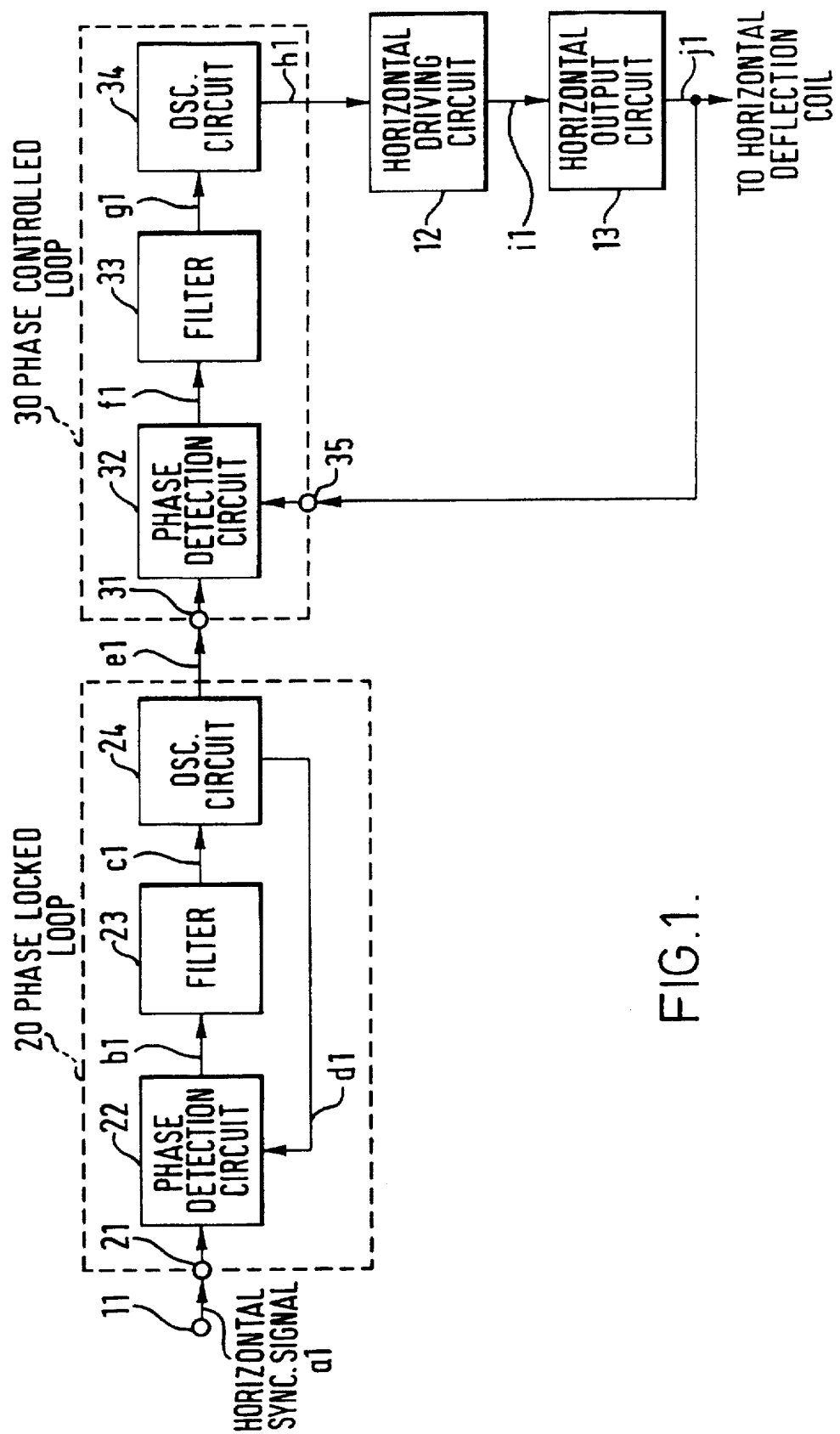
FIG. 1 is a block diagram showing a first embodiment of the horizontal synchronizing apparatus according to the present invention.
Figure 2:
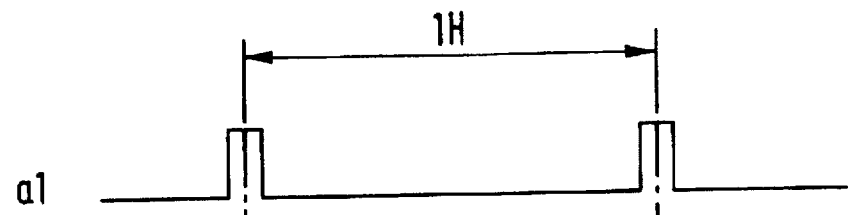
FIGS. 2(a)–2(f) are waveform-timing charts showing the normal operation of the horizontal synchronizing apparatus of FIG. 1.
Figure 2:
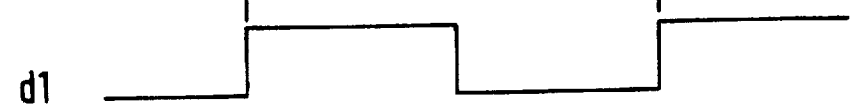
Figure 2:
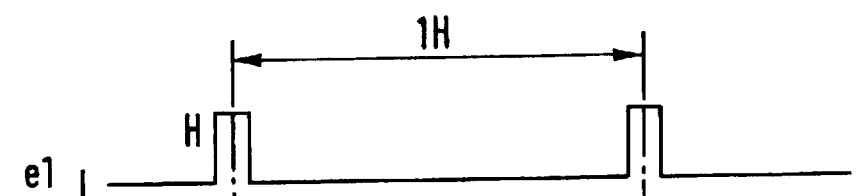
Figure 2:
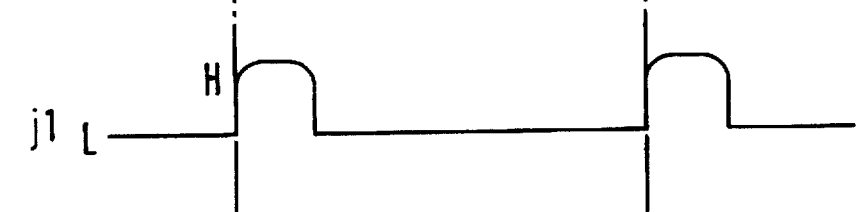
Figure 2:
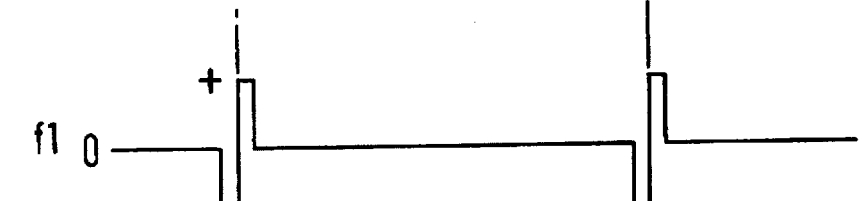
Figure 2:
Figure 3:
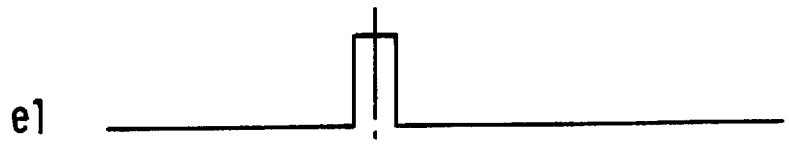
FIGS. 3(a)–3(d) are waveform-timing charts showing the operation of the horizontal synchronizing apparatus of FIG. 1, when the retrace pulse is delayed.
Figure 3:
Figure 3:
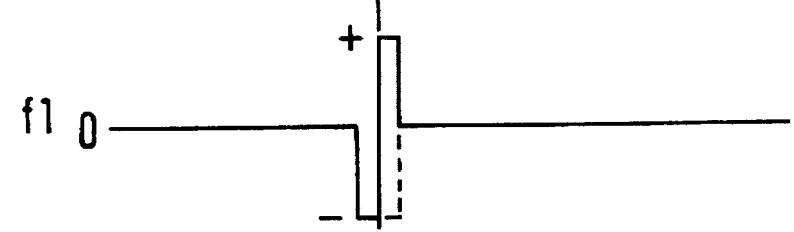
Figure 3:
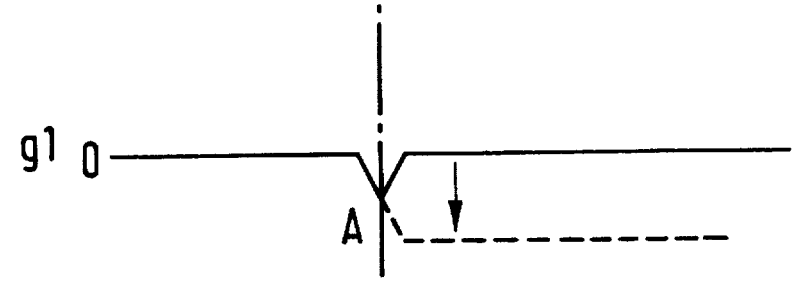
Figure 4:
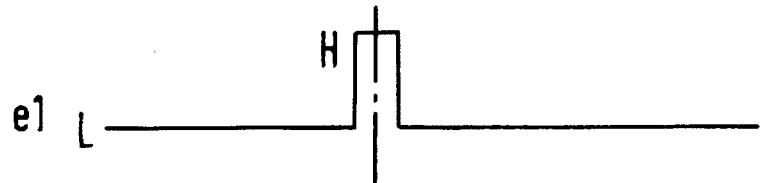
FIGS. 4(a)–4(d) are waveform-timing charts showing the operation of the horizontal synchronizing apparatus of FIG. 1, when the retrace pulse is varied.
Figure 4:
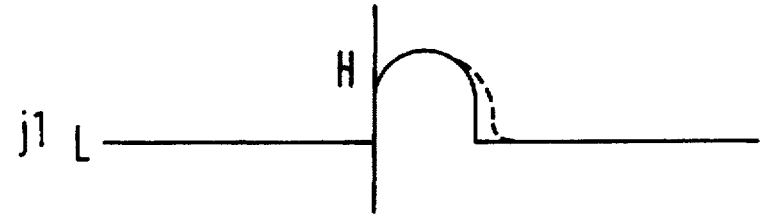
Figure 4:
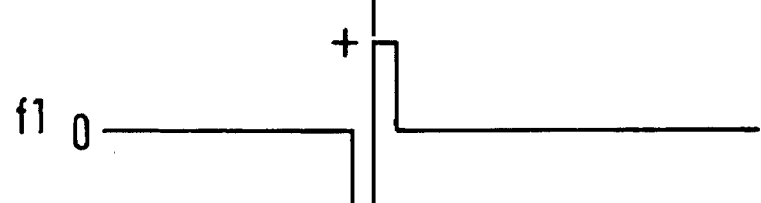
Figure 4:
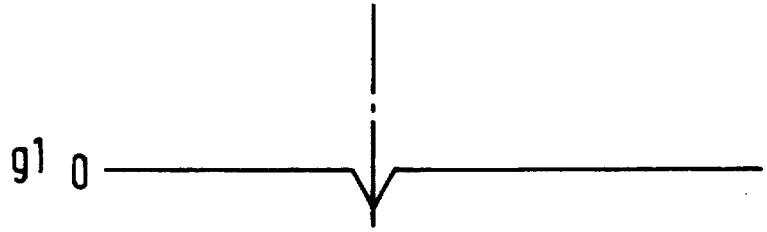

The present invention will be described in detail with reference to the FIGS. 1 through 7.

Throughout the drawings, like or equivalent reference numerals or letters will be used to designate like or equivalent elements for simplicity of explanation.

Referring now to FIGS. 1 through 4, a first embodiment of the horizontal synchronizing apparatus according to the present invention will be described in detail.

FIG. 1 denotes a block diagram showing the first embodiment of the horizontal synchronizing apparatus to the present invention.

In FIG. 1 the numeral 11 denotes an input terminal for receiving a horizontal sync. signal a1. The horizontal sync. signal a1 on the input terminal 11 is applied to an input terminal 21 of a phase locked loop 20.

The phase locked loop 20 consists of a phase detection circuit 22, a filter 23, and a oscillating circuit 24.

The horizontal sync. signal a1 on the input terminal 21 is supplied to the first input terminal of the phase detection circuit 22. A reference horizontal pulse signal d1 output form the oscillating circuit 24 is supplied to the second input terminal of the phase detection circuit 22.

The phase detection circuit 22 detects a phase error between the horizontal sync. signal a1 and the reference horizontal pulse signal d1 by comparing them, and generates a detected output current b1 resulting from this comparison and supplies it to the filter 23.

The filter 23 generates a control voltage c1 and supplies it to the oscillating circuit 24 by removing undesired components by passing the detected output current b1 from the phase detection circuit 22 through a low pass filter. The oscillating circuit 24 supply the reference horizontal pulse signal d1 which controls the phase based on the control voltage c1 from the filter 23 to the second input terminal of the phase detection circuit 22, and simultaneously generates a horizontal frequency bi-level signal e1 the phase of which is controlled based on the control voltage c1 and transmits it to the first input terminal 31 of a phase controlled loop 30. The bi-level signal e1 in this case becomes a high level in pulse periods, and becomes a low level in intervals other than the pulse periods.

A retrace pulse signal j1 from a horizontal output circuit 13 is to be applied to the second input terminal 35 of the phase controlled loop 30.

The phase controlled loop 30 consists of a phase detection circuit 32, a filter 33, and an oscillating circuit 34.

The bi-level signal e1 and the retrace pulse signal j1 applied to the input terminals 31, 35, thus being supplied to the first and second input terminals of the phase detection circuit 32, respectively.

The phase detection circuit 32 operates by being turned on under a control of the bi-level signal e1, and supplies a negative one of detected output currents f1 to the filter 33 when the retrace pulse signal j1 is in a low level and supplies a positive detected output current f1 to the filter 33 in the case the retrace pulse signal j1 is high level. While positive one of the becomes zero when the phase detection circuit 32 is turned off under a control of the bi-level signal e1.

The filter 33 generates a control signal g1 by removing undesired components from the detected output currents f1, and supplies the control signal g1 to the oscillating circuit 34, by passing the detected output current f1 from the phase detection circuit 32 through low pass filter. The oscillating circuit 34 supplies a phase control horizontal driving pulse signal h1 to a horizontal driving circuit 12 based on the control signal g1 from the filter 33. In this case, the oscillating circuit 34 is set up to delay the phase of the horizontal driving pulse signal h1 when the control signal g1 from the filter 33 increases, and to advance the phase of the horizontal driving pulse signal h1 when the control signal g1 decreases. The horizontal driving circuit 12 amplifies the shapes the horizontal driving pulse signal h1 from the oscillating circuit 34, and then supplies it as a horizontal driving pulse 11 to the horizontal output circuit 13. The horizontal output circuit 13 generates the retrace pulse signal j1 by performing a switching operation, and supplies it to both a horizontal deflection coil and the second input terminal of the phase controlled loop 30.

FIGS 2(a)–2(f) are waveform-timing charts showing the normal operation of the first embodiment of the horizontal synchronization apparatus according to the present invention. FIG. 2(a) denotes the horizontal sync. signal a1. FIG. 2(b) denotes the reference horizontal pulse signal d1. FIG. 2(c) denotes the bi-level signal e1. FIG. 2(d) denotes the retrace pulse signal j1. FIG. 2(a) denotes the detected output current f1. FIG. 2(f) denotes the control signal g1.

However, both the period of the horizontal sync. signal a1 shown in FIG. 2(a) and the period of the reference horizontal pulse signal d1 shown in FIG. 2(b) are one horizontal period (1H), the pulse width of reference horizontal pulse of the reference horizontal pulse signal d1 is wider than the pulse width of horizontal sync. pulse of the horizontal sync. signal a1. The phase detection circuit 22 detects a phase error between the horizontal sync. signal a1 and a reference horizontal pulse signal d1 for matching the timings of the center of the horizontal sync. pulse of the horizontal sync. signal a1 as shown in FIG. 2(a) and the leading edge of the reference horizontal pulse as shown in FIG. 2(b), and supplies a current b1 representing the detected phase error to the filter 23. So, the oscillating circuit 24 is supplied with the control voltage c1 which is set to match the timings of the center of the horizontal sync. pulse of the horizontal sync. signal a1 as shown in FIG. 2(a) with the leading edge of the reference horizontal pulse. The oscillating circuit 24 then generates the bi-level signal d1 as shown in FIG. 2(c) and transmits it to the first input terminal 31 of the phase controlled loop 30. In this case, the pulse width of the bi-level signal e1 is nearly the same with the pulse width of the horizontal sync. pulse of the horizontal sync. signal a1. The bi-level signal e1 is the pulse signal having a period equal to the one horizontal period (1H), but taking a response time into account the phase of the bi-level signal e1 is advanced for predetermined time compared to the horizontal sync. signal a1. Further, the bi-level signal e1 goes to a high level in the pulse period, while it goes to a low level in period other than the pulse period.

On the other hand, the retrace pulse signal j1 from the horizontal output circuit 13 is the pulse signal having the one horizontal period (1H) as shown in FIG. 2(d).

When the phase detection circuit 32 is in a suspension state, the detected output current f1 as shown in FIG. 2(e) is zero. The phase detection circuit 32 is operated by the pulses of the bi-level signal e1 to supply the negative (−) detected output current f1 to the filter 33 when the retrace pulse signal j1 is low level (L), or to supply the positive (+) detected output current f1 to the filter 33 when the retrace pulse signal j1 is high level (H). The filter 33 passes the detected output current f1 from the phase detection circuit 32 though a LPF. So, the control signal g1 from the filter 33 as shown in FIG. 2(f) becomes zero when the detected output current f1 is zero, and it lowers at a prescribed rate when the detected output current f1 is negative (−), but rises at a prescribed rate when the detected output current f1 is positive (+). The oscillation circuit 34 controls to delay the phase of horizontal driving pulse signal h1 when the control signal g1 rises, while the oscillation circuit 34 controls to advance the phase of horizontal driving pulse signal h1 when the control signal g1 lowers. So, the retrace pulse signal j1 from the horizontal output circuit 13 is controlled to match the timing of its pulse leading edge with the center phase of the bi-level signal e1.

FIGS. 3(a)–3(d) are waveform-timing charts showing the operation of the retrace pulse signal j1 in the first embodiment as shown in FIG. 1 when the retrace pulse delays. FIG. 3(a) denotes the bi-level signal e1. FIG. 3(b) denotes the retrace pulse signal j1. FIG. 3(c) denotes the detected output current f1. FIG. 3(d) denotes the control signal g1.

The solid line graphs of the bi-level signal e1, the retrace pulse signal j1, the detected output current f1, and control signal g1 shown in FIG. 3(a) through FIG. 3(d) coincide with the bi-level signal e1, the retrace pulse signal j1, the detected output current f1, and the control signal g1 as shown in FIG. 2(c) through FIG. 2(f).

As to the retrace pulse signal j1 as shown in FIG. 3(b), the phase detection circuit 32 supplies the negative (−) detected output current f1 as shown in FIG. 3(c) to filter 33 till the pulse period of the bi-level signal e1 as shown in FIG. 3(a) terminates when the phase of the retrace pulse as shown by the broken line has delayed after the pulse of the bi-level signal e1 as shown in FIG. 3(a). So, the control signal g1 from the filter 33 as shown in FIG. 3(d) lowers to a level −A till the pulse period of the bi-level signal e1 terminates as shown by the broken line. After that the state of the control signal g1 will continue till the bi-level signal e1 advances to the next pulse period. So, the oscillation circuit 34 controls to advance the phase of the horizontal driving pulse signal h1. So, the retrace pulse signal j1 from the horizontal output circuit 13 is controlled to hasten the timings of its pulse leading edge so as that the timing matches with the pulse center phase of the bi-level signal e1.

FIGS. 4(a)–4(d) are waveform-timing charts showing the operation of the retrace pulse signal j1 in the first period as shown in FIG. 1 when the pulse width of the retrace pulse has changed. FIG. 4(a) denotes the bi-level signal e1. FIG. 4(b) denotes the retrace pulse signal j1. FIG. 4(c) denotes the detected output current f1. FIG. 4(d) denotes the control signal g1.

The solid lines, in FIG. 49a) through FIG. 4(d), representing parts of the bi-level signal e1, the retrace pulse signal j1, the detected output current f1, and the control signal g1 coincide with the bi-level signal e1, the retrace pulse signal j1, the detected output current f1, and the control signal g1 as shown in FIG. 2(c) through FIG. 2(f).

In the retrace pulse signal j1 as shown in FIG. 4(b), the pulse width of the retrace pulse signal j1 becomes wide when the leading edge of the retrace pulse signal j1 as shown by the solid line does not delay from the pulse of the bi-level signals e1 as shown in FIG. 4(a), but the trailing edge of the retrace pulse delays after the pulse of the bi-level signals e1 as shown in FIG. 4(a), but the trailing edge of the retrace pulse delays after the pulse of the bi-level signals e1 as shown by the broken line. However as the pulse period of the bi-level signal e1 had terminated at the trailing edge of the retrace pulse signal j1, the detected output current f1 of the phase detection circuit 32 as shown in FIG. 4(c) becomes the state as shown in FIG. 2(e) independently of the pulse width of the retrace pulse signal j1. Also the control signal g1 from the filter 33 as shown in FIG. 4(d) becomes the state as shown in FIG. 2(f).

According to the first period as described above, the retrace pulse signal j1 has a pulse wider than the pulse of the bi-level signal e1. The phase detection circuit 32 is operated by the bi-level signal e1 to supply the positive detection output current f1 to the filter 33 when the retrace pulse signal j1 is in the high level. Thus if the pulse width varies due to brightness changes of images, the retrace pulse signal j1 does not cause any phase error from the bi-level signal e1. Therefore the first embodiment of the horizontal synchronization apparatus can prevent distortions in the images. Thus the first embodiment can make a good impression on viewers.

Figure 5:
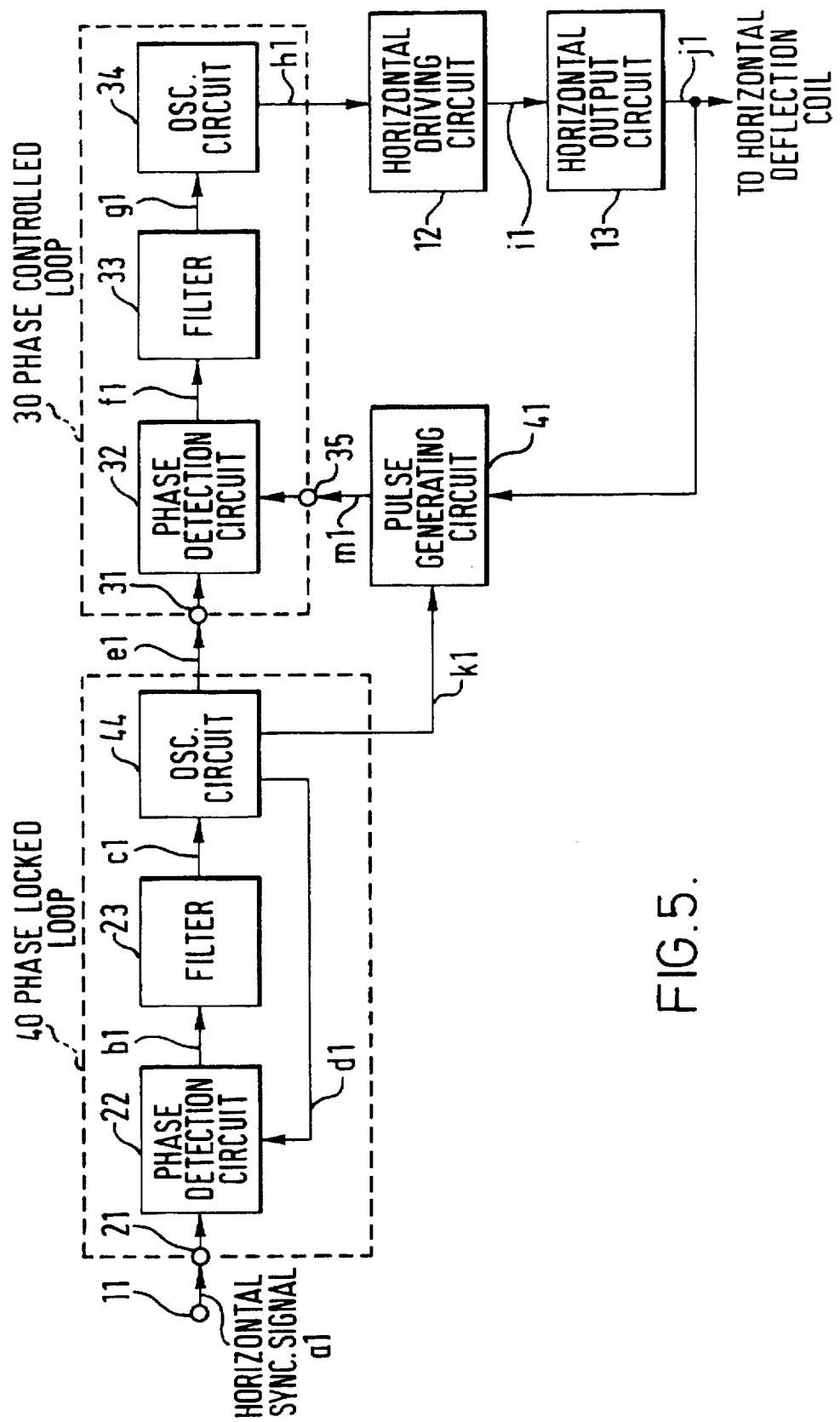
FIG. 5 is a block diagram showing a second embodiment of the horizontal synchronizing apparatus according to the present invention.
Figure 6:
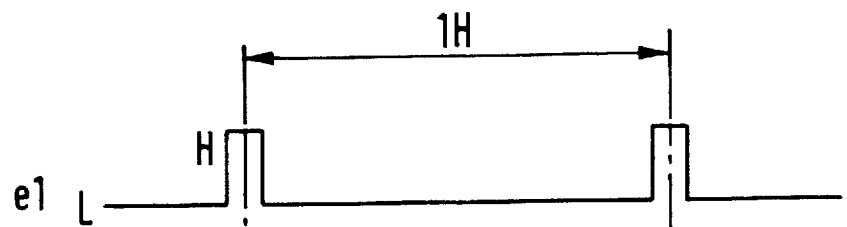
FIGS. 6(a)–6(f) are waveform-timing charts showing the operation of the horizontal synchronizing apparatus of FIG. 5.
Figure 6:
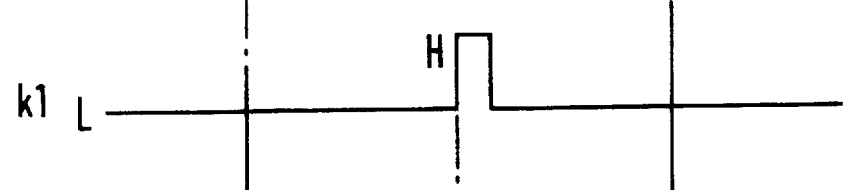
Figure 6:
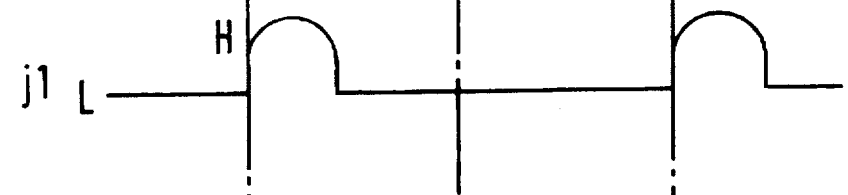
Figure 6:
Figure 6:
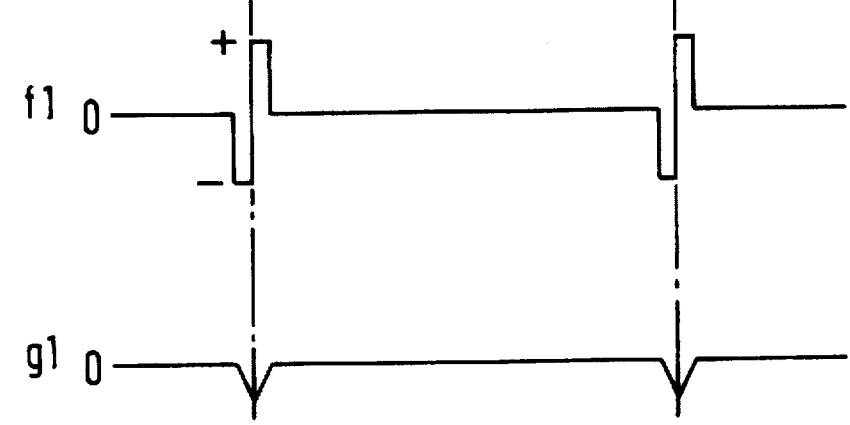
Figure 6:
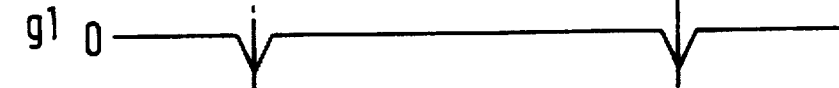

FIG. 5 is a block diagram showing a second embodiment of the horizontal synchronizing apparatus according to the present invention. In FIG. 5, the same components as the first embodiment of the horizontal synchronization apparatus as shown in FIG. 1 are omitted from following explanations by using the same references.

The second embodiment of the horizontal synchronization apparatus as shown in FIG. 5 is different from the first embodiment of the horizontal synchronization apparatus as shown in FIG. 1, in that an oscillating circuit 44 of a phase locked loop 40 supplies a delayed bi-level signal k1 to a pulse generating circuit 41, and the pulse generating circuit 41 generates a pulse signal m1 based on the delayed bi-level signal k1 and a retrace pulse signal j1 to supply the pulse signal m1 to a second input terminal 35 of a phase controlled loop 30.

When explaining the second embodiment of the horizontal synchronization apparatus in more detail, the oscillating circuit 44 of the phase locked loop 40 not only supplies a reference horizontal pulse signal d1 to the second input terminal of the phase detection circuit 22 likely to the oscillating circuit 24 in FIG. 1, but also produces a bi-level signal e1 with the horizontal frequency to transmit the bi-level signal e1 to the first input terminal 31 of the phase controlled loop 30. Further the oscillating circuit 44 generates another bi-level signal k1 with the horizontal frequency but delayed its phase by nearly a half wave-length from the bi-level signal e1 to transmit the bi-level signal k1 to the pulse generating circuit 41. The pulse generating circuit 41 comprises a flip-flop for generating the pulse signal m1 which becomes to a high level for a time period extending from the leading edge of the retrace pulse signal j1 to the high level to the leading edge of the delayed bi-level signal k1 to the high level, but becomes to a low level for a time period extending from the leading edge of the delayed bi-level k1 to the high level to the leading edge of the retrace pulse signal j1 to the high level thus for transmitting the pulse signal m1 to the second input terminal 35 of the phase controlled loop 30. The pulse signal m1 on the second input terminal 35 is supplied to the second input terminal of the phase detection circuit 32. Except the above the second embodiment of the horizontal synchronization apparatus as shown in FIG. 5 has the same construction as the first embodiment of the horizontal synchronization apparatus as shown in FIG. 1.

FIGS. 6(a)–6(f) are waveform-timing charts showing the operation of the second embodiment of the horizontal synchronization apparatus as shown in FIG. 5. FIG. 6(a) denotes the bi-level signal e1. FIG. 6(b) denotes the delayed bi-level signal k1. FIG. 6(c) denotes the retrace pulse signal j1. FIG. 6(d) denotes the pulse signal m1. FIG. 6(e) denotes the detected output current f1. FIG. 6(f) denotes the control signal g1.

The oscillating circuit 44 generates the bi-level signal e1 shown in FIG. 6(a) and the delayed bi-level signal k1 shown in FIG. 6(b) based on the control signal c1 to transmit them to the first input terminal 31 of the phase controlled loop 30 and the pulse oscillating circuit 41, respectively. In this case the bi-level signal e1 becomes the same as the bi-level signal e1 shown in FIG. 2(c). The delayed bi-level signal k1 becomes a pulse signal having the 1H period but delayed by nearly a half wave-length from the bi-level signal e1.

On the other hand, the retrace pulse signal j1 from the horizontal output circuit 13 is the pulse signal having the 1H period as shown in FIG. 6(c).

Accordingly the pulse signal m1 from the pulse oscillating circuit 41 shown in FIG. 6(d) becomes a high level for a time period extending from the leading edge of the retrace pulse signal j1 to the high level to the leading edge of the delayed bi-level signal k1 to the high level, but becomes a low level (L) for a time period extending from the leading edge of the delayed bi-level signal k1 to the high level to the leading edge of the retrace pulse signal j1.

When the phase detection circuit 32 is in a suspension state, the detected output current f1 as shown in FIG. 6(e) is zero. The phase detection circuit 32 is operated by the pulses of the bi-level signal e1 to supply the negative (−) detected output current f1 to the filter 33 when the retrace pulse m1 as shown in FIG. 6(d) is low level (L), or to supply the positive (+) detected output current f1 to the filter 33 when the retrace pulse m1 is high level (H). The control signal g1 from the filter 33, as shown in FIG. 6(f), becomes zero when the detected output current f1 is zero. The control signal g1 lowers at a prescribed rate when the detected output current f1 is negative (−) and rises at a prescribed rate when the detected output current f1 is positive. The oscillating circuit 34 controls for delaying the phase of the horizontal driving pulse signal h1 when the control signal g1 rises, or for advancing the phase of the horizontal driving pulse signal h1 when the control signal g1 lowers. So, the retrace pulse signal j1 from the horizontal output circuit 13 is controlled so that the timing of the pulse leading edge of the retrace pulse signal j1 matches with the pulse center phase of the bi-level signal e1.

According to the second embodiment of the horizontal synchronization apparatus as shown in FIG. 5, the period that the pulse signal m1 remains at the high level does not vary if the pulse width of the retrace signal j1 varies due to the brightness change of images. Thus the retrace pulse signal j1 does not cause any phase error from the bi-level signal e1. This second embodiment of the horizontal synchronization apparatus thus effects in similar to the first embodiment of the horizontal synchronization apparatus as shown in FIG. 1. In addition, because the pulse signal m1 is set to have a pulse duty close to 50%, this second embodiment of the horizontal synchronization apparatus has further effects that it will be possible to shorten and to stabilize the pull-in time of the phase controlled loop 30.

Figure 7:
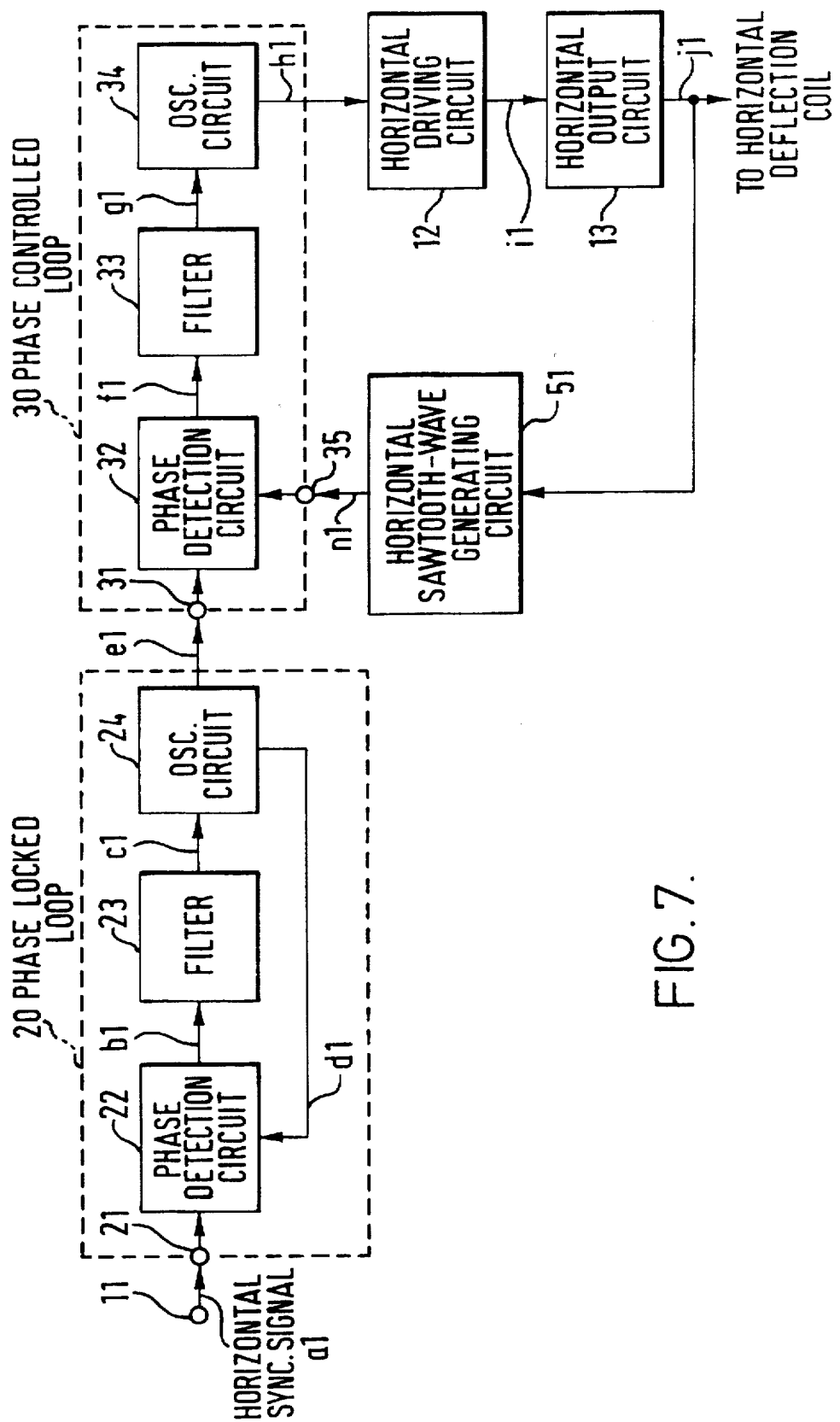
FIG. 7 is a block diagram showing a third embodiment of the horizontal synchronizing apparatus according to the present invention.

FIG. 7 is a block diagram showing a third embodiment of the horizontal synchronizing apparatus according to the present invention. In FIG. 7, the same components as the first embodiment of the horizontal synchronization apparatus as shown in FIG. 1 are omitted from following explanations by using the same references.

The third embodiment of the horizontal synchronization apparatus as shown in FIG. 7 is different from the first embodiment of the horizontal synchronization apparatus as shown in FIG. 1, in that a horizontal sawtooth-wave generating circuit 51 is inserted between the horizontal output circuit 13 and the second input terminal 35 of the phase controlled loop 30. The horizontal sawtooth-wave generating circuit 51 generates a sawtooth-wave signal n1 which sharply rises by the phase retrace pulse signal j1 from the horizontal output circuit 13, but slowly lowers in the period out of the retrace pulse signal j1 to transmit the sawtooth-wave signal n1 to the second input terminal 35 of the phase controlled loop 30.

The horizontal sawtooth-wave generating circuit 51 is able to supply a signal which becomes a high level (i.e., a reference level for determining the retrace pulse signal j1) at any given phase in the pulse period of the retrace pulse signal j1 to the second input terminal 35 of the phase controlled loop 30 by shaping the sawtooth wave signal n1 to an any given waveform.

According to the third embodiment of the horizontal synchronization apparatus as shown in FIG. 7, the period of the high level of the sawtooth wave signal n1 can be made wider than the pulse width of the bi-level signal e1. Thus the third embodiment of the horizontal synchronization apparatus as shown in FIG. 7 has effects similar to the first embodiment of the horizontal synchronization apparatus as shown in FIG. 1. Further in this third embodiment of the horizontal synchronization apparatus as shown in FIG. 7, as the saw-tooth wave signal n1 which becomes the high level at any given phase in the pulse period of the retrace pulse signal j1, it is possible to fine-adjust the phase of the retrace pulse signal j1 so as to advance the phase more than that of the first embodiment of the horizontal synchronization apparatus as shown in FIG. 1. Thus the third embodiment of the horizontal synchronization apparatus as shown in FIG. 7 is able to perform a very exact horizontal scanning of images.

Further, in the embodiments of the horizontal synchronization apparatus as shown in FIGS. 1, 5 and 7, the oscillating circuits 24, 44 generate the reference horizontal pulse signal d1 and the bi-level signal e1, respectively, by shaping ramp signals from ramp signal oscillators to produce pulses at any given phase position, or by dividing a clock signal with a frequency n times the horizontal frequency by using counters (n; any given natural number), and then generates the horizontal frequency pulse of proper phase by using signals on the output terminals and the clock signal.

As described above, the present invention can provide an extremely preferable horizontal synchronizing apparatus, which prevents phase errors between retrace pulses and bi-level signals from phase locked loops, when pulse widths of the retrace pulses have varied. Accordingly distortions of images on screens of picture tubes due to brightness changes etc. are effectively prevented so that it is able to give a good impression on viewers.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A method of synchronizing a phase controlled driving pulse signal for a display device with a video signal, comprising:

detecting a phase of said video signal;
   generating a bi-level signal having a phase that is based on said detected video signal phase;
   generating a control signal based on said bi-level signal and an edge of a feedback signal corresponding to a change in slope of the feedback signal;
   generating said phase controlled device pulse signal based on said control signal; and
   generating said feedback signal based on said phase controlled driving pulse signal, said control signal being changed in a first direction when said feedback signal is at a first level, said control signal being changed in a second direction when said feedback signal is at a second level different from the first level, changes in said control signal being made only during a pulse in said bi-level signal and at the edge of the feedback signal.

2. A method as recited by claim 1, wherein the control signal is generated based on a leading edge of the feedback signal.

3. A method of synchronizing a phase controlled driving pulse signal, for a display device with a video signal, comprising:

detecting a phase of said video signal;
   generating a bi-level signal having a phase that is based on said detected video signal phase;
   generating a control signal based on said bi-level signal and a feedback signal;
   generating said phase controlled driving pulse signal based on said control signal;
   generating said feedback signal based on said phase controlled driving pulse signal;
   generating a delay signal by delaying said bi-level signal; and
   modifying said feedback signal based on said delay signal to make a duty cycle of said feedback signal approximately 50% of a length of said feedback signal, wherein said control signal is changed based on said feedback signal, and wherein changes in said control signal are made only during a pulse in said bi-level signal.

4. A method as recited in claim 3, wherein generating said control signal includes comparing the phase of said bi-level signal and a phase of said feedback signal, and generating said control signal based on said comparison, wherein said control signal is generated with a negative level when said bi-level signal has a high level state and said feedback signal has a low level state, and
   wherein said control signal is generated with a positive level when said bi-level signal has a high level state and said feedback signal has a high level state.

5. A method of synchronizing a phase controlled driving pulse signal for a display device with a video signal, comprising:

detecting a phase of said video signal;
   generating a bi-level signal having a phase that is based on said detected video signal phase;
   generating a control signal based on said bi-level signal and an edge of a feedback signal corresponding to a change in slope of the feedback signal;
   generating said phase controlled driving pulse signal based on said control signal; and
   generating said feedback signal based on said phase controlled driving pulse signal, said control signal being changed in a first direction when said feedback signal is at a first level, said control signal being changed in a second direction when said feedback signal is at a second level different from the first level, a period for making changes to said control signal being limited based on said bi-level signal and the edge of the feedback signal.

6. A method as recited by claim 5, wherein the control signal is generated based on a leading edge of the feedback signal.

7. A method of synchronizing a phase controlled driving pulse signal for a display device with a video signal, comprising:

detecting a phase of said video signal;

generating a bi-level signal having a phase that is based on said detected video signal phase;

generating a control signal based on said bi-level signal and a feedback signal;

generating said phase controlled driving pulse signal based on said control signal; and generating said feedback signal based on said phase controlled driving pulse signal, wherein said control signal is changed based on an edge of said feedback signal corresponding to a change in slope of the feedback signal, wherein a period for making changes to said control signal is limited and is based on the edge of the feedback signal, and wherein a level of said control signal is negatively changed in response to a negative voltage feedback signal, and positively changed in response to a positive voltage feedback signal.

8. A method as recited in claim 7, wherein generating said control signal includes comparing the phase of said bi-level signal and a phase of said feedback signal, and generating said control signal based on said comparison, wherein said control signal is generated with a negative level when said bi-level signal has a high level state and said feedback signal has a low level state, and wherein said control signal is generated with a positive level when said bi-level signal has a high level state and said feedback signal has a high level state.

9. A method of synchronizing a phase controlled driving pulse signal for a display device with a video signal, comprising:

detecting a phase of said video signal;

generating a bi-level signal having a phase that is based on said detected video signal phase;

generating a control signal based on said bi-level signal and a feedback signal;

generating said phase controlled driving pulse signal based on said control signal; and generating said feedback signal based on said phase controlled driving pulse signal, wherein said control signal is changed based on an edge of said feedback signal corresponding to a change in slope of the feedback signal, wherein changes in said control signal are made only during a pulse in said bi-level signal and at the edge of the feedback signal, and wherein a level of said control signal is negatively changed in response to a negative voltage feedback signal, and positively changed in response to a positive voltage feedback signal.

10. A method as recited in claim 9, wherein generating said control signal includes comparing the phase of said bi-level signal and a phase of said feedback signal, and generating said control signal based on said comparison, wherein said control signal is generated with a negative level when said bi-level signal has a high level state and said feedback signal has a low level state, and wherein said control signal is generated with a positive level when said bi-level signal has a high level state and said feedback signal has a high level state.

11. A method of synchronizing a phase controlled driving pulse signal for a display device with a video signal, comprising:

detecting a phase of said video signal;

generating a bi-level signal having a phase that is based on said detected video signal phase;

generating a control signal based on said bi-level signal and a feedback signal by comparing the phase of said bi-level signal and a phase of said feedback signal, and generating said control signal based on said comparison;

generating said phase controlled driving pulse signal based on said control signal; and generating said feedback signal based on said phase controlled driving pulse signal, wherein said control signal is changed based on an edge of said feedback signal corresponding to a change in slope of the feedback signal, wherein changes in said control signal are made only during a pulse in said bi-level signal and at the edge of the feedback signal, wherein said control signal is generated with a negative level when said bi-level signal has a high level state and said feedback signal has a low level state, and wherein said control signal is generated with a positive level when said bi-level signal has a high level state and said feedback signal has a high level state.

12. A method of synchronizing a phase controlled driving pulse signal for a display device with a video signal, comprising:

detecting a phase of said video signal;

generating a bi-level signal having a phase that is based on said detected video signal phase;

generating a control signal base don said bi-level signal and a feedback signal by comprising the phase of said bi-level signal and a phase of said feedback signal, and generating said control signal based on said comparison;

generating said phase controlled driving pulse signal based on said control signal; and generating said feedback signal based on said phase controlled driving pulse signal, wherein said control signal is changed based on an edge of said feedback signal corresponding to a change in slope of the feedback signal, wherein a period for making changes to said control signal is limited and is based on the edge of the feedback signal, and wherein said control signal is generated with a negative level when said bi-level signal has a high level state and said feedback signal has a low level state, and wherein said control signal is generated with a positive level when said bi-level signal has a high level state and said feedback signal has a high level state.

13. A method of synchronizing a phase controlled driving pulse signal for a display device with a video signal, comprising:

detecting a phase of said video signal;

generating a bi-level signal having a phase that is based on said detected video signal phase;

generating a control signal based on said bi-level signal and a feedback signal by comparing the phase of said bi-level signal and a phase of said feedback signal, and generating said control signal based on said comparison;

generating said phase controlled driving pulse signal based on said control signal; and generating said feedback signal based on said phase controlled driving pulse signal, wherein said control signal is changed based on an edge of said feedback signal corresponding to a change in slope of the feedback signal, wherein the period for making changes to said control signal is limited based on said bi-level signal and at the edge of the feedback signal, wherein said control signal is generated with a negative level when said bi-level signal has a high level state and said feedback signal has a low level state, and wherein said control signal is generated with a positive level when said bi-level signal has a high level state and said feedback signal has a high level state.

* * * * *